(Model.)
N. JENKINS.
SPRING FOR CLOTHING.
No. 248,754.    Patented Oct. 25, 1881.
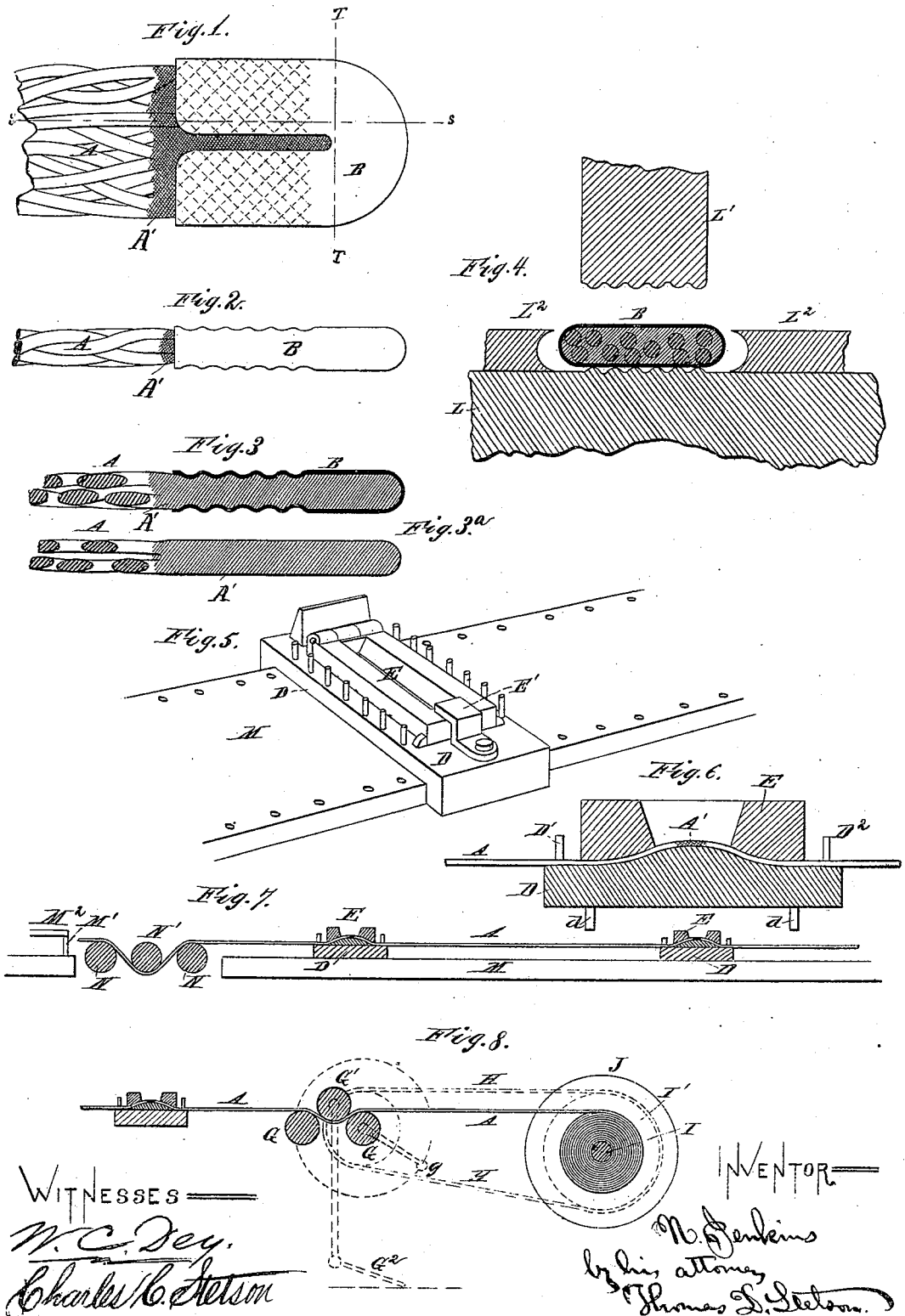

UNITED STATES PATENT OFFICE.

NICHOLAS JENKINS, OF NEW HAVEN, CONNECTICUT.

SPRING FOR CLOTHING.

SPECIFICATION forming part of Letters Patent No. 248,754, dated October 25, 1881.

Application filed March 22, 1880. (Model.)

*To all whom it may concern:*

Be it known that I, NICHOLAS JENKINS, a citizen of the United States, residing in the city and county of New Haven, in the State of Connecticut, have invented certain new and useful Improvements Relating to Springs for Clothing and other Small Uses, of which the following is a specification.

My improved spring is well adapted for use in stiffening clothing, but it may be used with advantage in a great variety of situations where small springs are required. It gives a deadened action, yielding in all directions with just sufficient resistance and returning to its original position with moderate force, the deadness being attributable to the gentle friction of the several wires against each other in the working.

I manufacture a spring or stiffener possessing especially desirable qualities by braiding small wires of steel or hard brass, or analogous elastic metal, soldering the ends together and capping over the soldered ends with a metal cap to form a smooth finish, which will not cut or injure the fabric in which it is held.

I have devised machinery or apparatus for facilitating the several operations required, which is made the subject of another application for patent, filed February 20, 1880, and such machinery and apparatus I do not claim in this application.

The metal caps are compressed or flattened upon the wire spring by means of suitable dies, which allow them to take a firm hold. Heat may be applied to cause the solder to adhere to the caps, if desired in any case, and I have done so in the most complete form of invention.

The following is a description of the invention:

The accompanying drawings form a part of this specification.

Figure 1 is a view of an end of one of my finished springs, seen flatwise. Fig. 2 is a corresponding edge view. Fig. 3 is a section on line S S in Fig. 1. Fig. 4 is a section on line T T in Fig. 1. This figure also shows the adjacent portions of the compressing-dies, which are employed in the act of setting the cap firmly upon the spring. Fig. 5 is a perspective view of a portion of the apparatus which I employ in soldering the several wires together previous to cutting them. It will be understood that I braid the springs in lengths of some hundred feet (more or less) on a suitable machine adapted to produce flat braids, and apply solder in small quantities at the required distances apart, and then cut off the spring in the middle of each soldered point, so as to leave each end of each spring soldered firmly together. Fig. 6 is a section across one of the soldering-clamps in the plane of one of the springs. Fig. 7 is a section on a smaller scale. Fig. 8 shows the winding apparatus. Fig. $3^a$ is a section through a modified construction, having the end soldered and smoothly rounded by any suitable means without a cap.

Similar letters of reference indicate like parts in all the figures.

The machine upon which the spring is made must be of the kind adapted to produce flat braid, or the braid after its manufacture must be flattened to produce a properly-flattened spring. After the spring is braided together it is soldered at suitable distances, (represented by A' in the drawings.) The soldering is preferably done on an apparatus shown in Figs. 5 to 8. This, as above stated, is made the subject-matter of a separate application for patent. In these figures, D E are clamps, having the button E', holding the long spring A, which are adjustably placed upon the table M. Several springs may be soldered at one and the same time, being guided by pins M' and under cross-bar $M^2$, and being drawn through by means of the sets of rollers N N' and G G', operated by the hand-crank *g* and treadle $G^2$, being soldered as it passes along and passing to the winding device H I I' J. The next operation after soldering is to cut off the several lengths of springs, which may be effected by suitable stout shears, taking care to cut through each soldered point A'. This leaves the springs of the proper length, but tends to make the ends sharp-cornered. I finish each end of each spring by applying a metal cap, B. In my experiments I have used what are known as "open caps." They are forced on by hand or otherwise, and are afterward compressed in place, so as to take firm hold of the soldered surface within not only by friction, but by a sort of interlocking action due to the corrugations on the dies, which imprint themselves in the flat faces of the cap, and also to some extent in the solder and wire within. The ends being of the same width as the other parts of each spring is important in two respects—it facilitates the manufacture in extended lengths and it aids to prevent the spring from forcing itself through the fabric at the ends of the pockets.

In Fig. 4, L L' L² are dies which are used in setting the cap B upon the soldered end of the spring. The dies are grooved or corrugated in any suitable way to produce similar corrugations in the cap and insure a firm hold upon the soldered end.

I have used successfully hard-brass wire of No. 26 gage, with the caps B made from softer brass—No. 30. The several wires, being bent in the proper form in the process of braiding, tend to maintain that form with great pertinacity. This gives the required stiffness to the spring. The division of the metal into many fine wires gives a capacity for bending without taking a permanent set, which is greatly in excess of that in ordinary springs of equal strength. The capacity to bend is certainly much greater than that of other springs of equal size. The magnitude of the springs performs an important function in dresses where it is important to avoid small sharply-defined ridges appearing on the surface, and also in many articles where the springs show themselves distinctly and produce an ornamental appearance. The fact that the wires are separate and cross each other at angles, as shown, and that the wires change their position with the bending of the springs in any direction serves an important function in deadening the spring or giving it less lively elasticity than is possessed by common springs.

My improved springs possess a character between that of ordinary lively springs and a leathery condition—complete flexibility. My springs will return after each flexion to their original position, or nearly so. They will maintain their moderate liveliness for an indefinite period; but their moderation in returning is of value in fancy articles in preventing their rebounding after being bent, and in articles of clothing in allowing the clothes to hang gracefully without violent motion.

Having thus described my invention, I desire to claim—

The braided-wire spring A, having soldered ends and provided with the terminal caps B, held in place by compression and the aid of solder, as set forth and described.

In testimony whereof I have hereunto set my hand, at New York city, this 15th day of March, 1880, in the presence of two subscribing witnesses.

NICHOLAS JENKINS.

Witnesses:
THOMAS D. STETSON,
W. COLBORNE BROOKES.